United States Patent
Kajimoto et al.

[11] 3,723,486
[45] Mar. 27, 1973

[54] PROCESS FOR PRODUCTION OF CARBOXYLIC ESTERS

[75] Inventors: Tsunesuke Kajimoto; Shigeru Wakamatsu; Ryoji Nakanishi; Michio Hara; Kiyotaka Ohno; Jiro Tsuji, all of Kamakura, Japan

[73] Assignee: Toray Industries, Inc., Tokyo, Japan

[22] Filed: Oct. 21, 1971

[21] Appl. No.: 191,361

[52] U.S. Cl. ....260/410.9 R, 260/429 R, 260/497 A, 260/468 CB
[51] Int. Cl.............................................C07c 67/00
[58] Field of Search..................260/497 A, 533 A, 260/429 R, 410.9

[56] References Cited

UNITED STATES PATENTS 3,437,676  4/1969  von Kuterow et al. ...........260/497 X

*Primary Examiner*—Henry R. Jiles
*Assistant Examiner*—Richard D. Kelly
*Attorney*—Austin R. Miller et al.

[57] ABSTRACT

Process for carbonylation of olefinically unsaturated hydrocarbons to produce carboxylic esters by reaction in the presence of a palladium complex represented by the general formula $$[PdCl_2(PPh_3)_2]_2(C_6H_4Cl_2)_x .$$

Carbon monoxide and alcohol are reacted with the olefinically unsaturated hydrocarbons.

3 Claims, No Drawings

PROCESS FOR PRODUCTION OF CARBOXYLIC ESTERS

This invention relates to a new process for the production of carboxylic esters. Furthermore this invention relates to a process for carbonylation of olefinically unsaturated hydrocarbons to produce carboxylic esters in the presence of a new palladium complex.

Heretofore it has been known that a certain type of palladium complex has a catalytic effect on the carbonylation reaction of olefins. For example the U.S. Pat. No. 3,437,676 discloses that a palladium complex represented by the general formula, Lm Pd Xn can be used as a catalyst for the carbonylation reaction of olefins to produce carboxylic esters.

According to this invention, it has now been found that in the presence of a new palladium complex, which acts as a catalyst, the olefinically unsaturated hydrocarbons react with carbon monoxide and alcohol to form carboxylic esters.

The new palladium complex is represented by the general formula $[PdCl_2(PPh_3)_2]_2(C_6H_4Cl_2)_x$, wherein $x$ is a number from 0.5 to 1.5. It can be prepared by reacting palladium chloride or complex salts thereof with dichlorobenzene and triphenylphosphine.

Examples of these complex salts of palladium chloride, which may be reacted to produce the complex of the present invention, are sodium chloropalladate, bis(benzonitrile)dichloropalladium, and bis(triphenylphosphine)dichloropalladium.

The new palladium complex used as a catalyst in the present invention can be characterized by its nuclear magnetic resonance spectrum, infra-red spectrum and x-ray diffraction spectrum.

The nuclear magnetic resonance spectrum of the new palladium complex measured in deuterochloroform solution shows a sharp characteristic signal at 2.78 $\tau$ (Tau-value) besides signals at the range of 2.1 to 2.9 $\tau$ which are based on the hydrogen atoms of the monosubstituted benzene nucleus.

The infra-red spectrum shows the following absorption peaks: 3004 $cm^{-1}(w)$, 1980 $cm^{-1}(w)$, 1900 $cm^{-1}(w)$, 1830 $cm^{-1}(w)$, 1780 $cm^{-1}(w)$, 1585 $cm^{-1}(w)$, 1570 $cm^{-1}()$, 1480 $cm^{-1}(s)$, 1460 $cm^{-1}(w)$, 1435 $cm^{-1}(s)$, 1390 $cm^{-1}(w)$, 1330 $cm^{-1}(w)$, 1310 $cm^{-1}(w)$, 1275 $cm^{-1}()$, 1175 $cm^{-1}(m)$, 1160 $cm^{-1}(w)$, 1095 $cm^{-1}(s)$, 1070 $cm^{-1}(w)$, 1025 $cm^{-1}(m)$, 1010 $cm^{-1}(m)$, 995 $cm^{-1}()$, 845 $cm^{-1}(w)$, 820 $cm^{-1}(m)$, 745 $cm^{-1}(s)$, 740 $cm^{-1}()$, 705 $cm^{-1}(s)$, 695 $cm^{-1}(s)$.

The X-ray diffraction spectrum thereof shows the characteristic peaks as cited in Table 1 which were observed using a Debye-Scherrer camera (35 KV – 15 mA, CuK $\alpha$ Ni-filter).

TABLE 1

X-ray diffraction spectrum of the new palladium complex

| No. | Intensity | 2θ (°) | d (A) |
|-----|-----------|--------|-------|
| 1 | VW | 8.3 | 10.65 |
| 2 | VS | 9.5 | 9.31 |
| 3 | VS * | 11.0 | 7.97 |
| 4 | m | 12.0 | 7.73 |
| 5 | W | 14.6 | 6.07 |
| 6 | W | 16.4 | 5.40 |
| 7 | S | 18.5 | 4.80 |
| 8 | S | 20.3 | 4.37 |
| 9 | W | 22.0 | 4.04 |
| 10 | m | 22.9 | 3.88 |
| 11 | W * | 24.1 | 3.69 |
| 12 | W | 25.5 | 3.49 |
| 13 | W | 27.1 | 3.29 |
| 14 | W | 28.6 | 3.12 |
| 15 | W | 29.6 | 3.02 |
| 16 | W | 31.1 | 2.88 |
| 17 | W | 32.2 | 2.78 |
| 18 | W | 33.9 | 2.64 |

* broad peak

The new palladium catalyst used in the process of this invention can be prepared according to the method described hereunder.

A palladium chloride complex salt, which may be sodium chloropalladate, bis(benzonitrile)dichloropalladium, or bis(triphenylphosphine)dichloropalladium, is dispersed or dissolved in orthodichlorobenzene. To this dispersion or solution thus obtained more than 2 molar equivalents of triphenylphosphine per molar equivalent palladium is added and the resultant mixture is heated, preferably at a temperature of 90° to 200°C, to dissolve the dispersed complex salt and to react it with the triphenylphosphine.

When the palladium complex salt contains triphenylphosphine as a ligand, the amount of triphenylphosphine added thereto can be reduced to less than 2 molar equivalent per mole palladium. When bis(triphenylphosphine)dichloropalladium is used as the starting material, addition of triphenylphosphine is completely unnecessary. The reaction time is not critical but usually about 1 hour is sufficient. After the insoluble material is filtered off, the solution is allowed to cool to room temperature. The product, a new palladium complex is isolated as transparent yellow crystals from the solution. However when this complex is used in carbonylation reaction as catalyst, it may be used without isolation thereof. The dichlorobenzene solution of the new palladium complex can also be incorporated in the carbonylation reaction media for the catalysis thereof.

The olefinically unsaturated hydrocarbons to which the process of this invention can be applied are those having two to eight carbon atoms and one olefinic double bond. For example ethylene, propylene, cyclohexene and cyclooctene can be cited.

Alcohols used in this invention may be methanol, ethanol, propanol, butanol, isopropanol, cyclohexanol and benzyl alcohol.

The process of this invention is carried out under more or less elevated pressure, for example 30 to 1000 atmospheres, preferably 50 to 300 atmospheres. Co-existence of some inert gases shows no appreciable effect on the reaction.

The reaction temperature is usually 50° to 200°C, preferably 90° to 150°C.

The use of a solvent is not critical, but benzene, toluene, xylene, chlorobenzene, anisole, or dichlorobenzene, for example, can be used as the solvent. However, orthodichlorobenzene is the most preferable solvent for the process of this invention, because the use of this solvent facilitates recovery of the palladium catalyst.

The amount of the palladium catalyst is usually 0.001 to 1 molar percent based on the olefinically unsaturated hydrocarbon. Addition of extra triphenylphosphine to the reaction system is preferable.

The process of this invention can be put into operation either continuously or batchwise.

The invention is further illustrated by the following examples, in which the term ortho-dichlorobenzene means commercially available orthodichlorobenzene which is usually contaminated with a small amount of para-isomer.

Example 1 (Catalyst Preparation)

Into 300 ml of commercially available o-dichlorobensene (containing some p-isomer (21%)), 0.5 g of palladium dichloride was added and the temperature of the mixture was allowed to rise to 100°C with stirring. To the solution, 2.5 g of triphenylphosphine was added and the temperature of the solution was kept at 100°C for 1 hour with stirring. Then the hot yellow solution was filtered and the filtrate was allowed to cool. After a day yellow crystalline precipitate was filtered off and washed with toluene. The weight of the complex was 13 g and the elemental analysis indicated the formula to be $[PdCl_2(PPh_3)_2]_2(C_6H_4Cl_2)$. The spectra of NMR, IR and X-ray of the complex were as described heretofore in the specification.

Example 2 (Catalyst Preparation)

Into 100 ml of commercially available o-dichlorobenzene, 0.384 g of bis(benzonitrile)dichloropalladium was added and the temperature of the solution was allowed to rise to 80°C with stirring. Then 0.6 g of triphenylphosphine was added. After keeping the temperature of the solution at 80°C for 30 minutes with stirring, the hot yellow solution was allowed to cool. After a day, the precipitated yellow crystals were filtered off and washed with benzene. The analysis of the new complex showed the stoichiometry as $[PdCl_2(PPh_3)_2]_2(C_6H_4Cl_2)$. The spectra of NMR, IR and X-ray of the complex were the same as described heretofore in the specification.

Example 3 (Catalyst Preparation)

Into 1500 ml of o-dichlorobenzene, 10 g of bis(triphenylphosphine)dichloropalladium was added and the temperature of the solution was allowed to rise to 110°C with stirring. 10 g of triphenylphosphine was then added. After keeping the temperature of the solution at 110°C for 1 hour, the hot yellow solution was allowed to cool for a day. The precipitated crystals were filtered off and washed with toluene. The weight of the precipitated complex was 10.6 g. Its stoichiometry was shown to be $[PdCl_2(PPh_3)_2]_2(C_6H_4Cl_2)$. The spectra of NMR, IR and X-ray of the complex were the same as described heretofore in the specification.

Example 4

Into a stainless steel autoclave, 32 g of methanol, 0.7 g of the above described new palladium complex, $[PdCl_2(PPh_3)_2]_2(C_6H_4Cl_2)$, and 0.524 g of triphenylphosphine were charged. After the autoclave was closed and flushed out with nitrogen, 24 g of liquid propylene was pumped in and then carbon monoxide was forced in at room temperature up to a pressure of 150 kg/cm² gauge. The autoclave was heated to 130°C and its contents were allowed to react for 5 hours, while mixing of the solution was accomplished by a magnetically rotatory inner turbine. The autoclave was then allowed to cool and its internal pressure reduced. The formation of 46.5 g of methyl n-butyrate and 51.5 g of methyl isobutyrate was confirmed by gas chromatographic analysis. The total yield of the esters with reference to the charged propylene was 96.2 percent.

Example 5

Into a 1 l stainless steel autoclave, 96 g of methanol, 0.43 g of the new palladium complex, $[PdCl_2(PPh_3)_2]_2(C_6H_4Cl_2)$, 1.26 g of triphenylphosphine and 200 ml of o-dichlorobenzene were charged. After the autoclave was closed and flushed out with nitrogen, 126 g of liquid propylene was pumped in and then carbon monoxide was forced in up to a pressure of 100 kg/cm² gauge at room temperature. The autoclave was heated to 130°C and kept at this temperature for 16 hours while mixing of the solution was accomplished by a magnetically rotatory inner turbine. The analysis of the product showed the formation of 117.5 g of methyl n-butyrate and 153.4 g of methyl isobutyrate.

Example 6

Into a 1 l stainless steel autoclave, 96 g of methanol, 0.43 g of the new palladium complex, $[PdCl_2(PPh_3)_2]_2(C_6H_4Cl_2)$, 1.26 g of triphenylphosphine and 200 ml of toluene were charged. After the autoclave was closed and flushed out with nitrogen, 126 g of liquid propylene was pumped in and then carbon monoxide was forced in up to a pressure of 100 kg/cm² gauge at room temperature. The autoclave was heated to 130°C and kept at that temperature for 16 hours while mixing of the solution was accomplished by a magnetically rotatory inner turbine. Analysis of the product showed that 89 g of methyl n-butyrate and 98 g of methyl isobutyrate had been produced.

Example 7

Into a 1 l stainless steel autoclave, 0.43 g of the new palladium complex, $[PdCl_2(PPh_3)_2]_2(C_6H_4Cl_2)$, 1.26 g of triphenylphosphine and 200 ml of anisole were charged. After the autoclave was closed and flushed out with nitrogen, 126 g of liquid propylene was pumped in and then carbon monoxide was forced in up to a pressure of 100 kg/cm² gauge at room temperature. The autoclave was heated up to 130°C and kept at that temperature for 16 hours. Analysis of the product showed that 106.5 g of methyl n-butyrate and 110 g of methyl isobutyrate had been produced.

Example 8

Into a 500 ml stainless steel autoclave, 0.42 g of the new palladium complex, $[PdCl_2(PPh_3)_2]_2(C_6H_4Cl_2)$, 1.258 g of triphenylphosphine and 100 g of anisole were charged. After the autoclave was closed and flushed out with nitrogen, 75.6 g of liquid propylene was pumped in and then carbon monoxide was forced in up to a pressure of 100 kg/cm² gauge at room temperature. The autoclave was heated to 120°C and methanol was continuously pumped in, to maintain the molar ratio of methanol to palladium in the reactor at nearly 500 throughout a 10 hour reaction period. The pressure of the autoclave was kept at 150 kg/cm² gauge by charging additional carbon monoxide through a pressure regulator. The gas chromatograph analysis of the product showed that 89.3 g of methyl n-butyrate and 93.5 g of methyl isobutyrate had been produced.

The total yield of the esters with reference to the charged propylene was nearly quantitative.

Example 9

Into a 500 ml stainless steel autoclave, 0.42 g of the new palladium complex, $[PdCl_2(PPh_3)_2]_2(C_6H_4Cl_2)$, 1.258 g of triphenylphosphine and 100 g of o-dichlorobenzene were charged. After the autoclave was closed and flushed out with nitrogen, 75.6 g of liquid propylene was pumped in and then carbon monoxide was forced in up to a pressure of 100 kg/cm² gauge at room temperature. The autoclave was heated to 120°C and methanol was continuously pumped in to maintain the molar ratio of methanol to palladium at nearly 500 throughout a 10 hour reaction period. The pressure of the autoclave was kept at 150 kg/cm² gauge by charging additional carbon monoxide through a pressure regulator. The gas chromatograph analysis of the product showed that 79.0 g of methyl n-butyrate and 104.3 g of methyl isobutyrate had been produced.

The following is claimed:

1. A process for the production of carboxylic esters which comprises reacting an olefinically unsaturated hydrocarbon having two to eight carbon atoms and one olefinic double bond with carbon monoxide and an aliphatic alcohol having one to seven carbon atoms in the presence of a palladium complex catalyst represented by the general formula, $$[Pd\,Cl_2(PPh_3)_2]_2(C_6H_4Cl_2)\,x$$

wherein Ph represents a phenyl group of $x$ is a number between 0.5 to 1.5.

2. A process was claimed in claim 1, wherein the amount of said palladium complex catalyst is 0.001 to 1 molar % based on said olefinically unsaturated hydrocarbons.

3. A process according to claim 1, wherein said palladium complex catalyst is prepared by heating at a temperature of 90° – 200°C to dissolve a palladium compound selected from the group consisting of palladium chloride and complex salts of palladium chloride and 2 to 15 molar equivalents of triphenylphosphine in dichlorobenzene and permitting said compounds to react.

* * * * *